(12) United States Patent
Giordano

(10) Patent No.: US 11,079,845 B2
(45) Date of Patent: Aug. 3, 2021

(54) SYSTEM, METHOD, AND APPARATUS FOR THERAPY AND COMPUTER USAGE

(71) Applicant: Matt Giordano, Rochchester, NY (US)

(72) Inventor: Matt Giordano, Rochchester, NY (US)

( * ) Notice: Subject to any disclaimer, the term of this patent is extended or adjusted under 35 U.S.C. 154(b) by 87 days.

(21) Appl. No.: 16/397,389

(22) Filed: Apr. 29, 2019

(65) Prior Publication Data
US 2020/0341548 A1   Oct. 29, 2020

(51) Int. Cl.
*G06F 3/01* (2006.01)
*G06F 3/02* (2006.01)

(52) U.S. Cl.
CPC .............. *G06F 3/014* (2013.01); *G06F 3/015* (2013.01); *G06F 3/016* (2013.01); *G06F 3/02* (2013.01); *G06F 2203/011* (2013.01)

(58) Field of Classification Search
CPC .... A61N 1/0404; A61N 1/04; A61N 1/36014; A61B 5/0053; A61B 5/6804; A61B 5/165; A61B 5/0492; G06F 3/014; G06F 3/017; G06F 1/163; G06F 3/016; G06F 2203/0331; G06F 3/011
See application file for complete search history.

(56) References Cited

U.S. PATENT DOCUMENTS

| | | |
|---|---|---|
| 10,181,331 B2 | 1/2019 | Eagleman et al. |
| 10,198,076 B2 | 2/2019 | Eagleman et al. |
| 2008/0171914 A1 | 7/2008 | Ouwerkerk et al. |
| 2009/0322680 A1 | 12/2009 | Festa |
| 2014/0219702 A1 | 8/2014 | Pincus et al. |
| 2014/0320393 A1* | 10/2014 | Modarres ................ G06F 3/017 345/156 |
| 2015/0040282 A1 | 2/2015 | Longinotti-Buitoni et al. |
| 2015/0366504 A1* | 12/2015 | Connor ................ A61B 5/0492 600/301 |
| 2015/0370320 A1* | 12/2015 | Connor ................ A61B 5/1126 345/173 |
| 2016/0179198 A1* | 6/2016 | Levesque ................ G06F 1/163 340/407.1 |
| 2016/0179199 A1* | 6/2016 | Levesque ................ G06F 3/014 340/407.2 |
| 2017/0042439 A1* | 2/2017 | Yeow .................... A61B 5/0006 |
| 2017/0340270 A1 | 11/2017 | Ganesh |
| 2018/0033263 A1 | 2/2018 | Novich et al. |
| 2018/0033330 A1* | 2/2018 | Darmour ................ A61B 5/486 |
| 2018/0067558 A1 | 3/2018 | Eagleman et al. |
| 2018/0085283 A1 | 3/2018 | Rahman |
| 2018/0233163 A1 | 8/2018 | Eagleman |
| 2018/0303702 A1 | 10/2018 | Novich et al. |
| 2018/0307314 A1* | 10/2018 | Connor .................. G01R 27/02 |
| 2019/0108852 A1 | 4/2019 | Eagleman et al. |
| 2019/0121439 A1 | 4/2019 | Eagleman et al. |

(Continued)

*Primary Examiner* — Justin S Lee
(74) *Attorney, Agent, or Firm* — Heslin Rothenberg Farley & Mesiti P.C.

(57) ABSTRACT

A method of soothing a wearer of a body-worn device includes detecting an emotional state of the wearer of the body-worn device by reading sensors associated with the body-worn device. Based upon the emotional state, one or more of a plurality of sensation emitting devices of the body-worn device are energized a pattern, providing soothing to the wearer of the body-worn device. In one pattern, sequential energization of the plurality of sensation emitting devices simulated stroking of the person wearing the body-worn device.

23 Claims, 14 Drawing Sheets

(56) References Cited

U.S. PATENT DOCUMENTS

| | | | |
|---|---|---|---|
| 2019/0223773 A1* | 7/2019 | Galm | A61B 5/18 |
| 2019/0384404 A1 | 12/2019 | Raghoebard et al. | |
| 2020/0019242 A1* | 1/2020 | Atlas | A61B 5/744 |
| 2020/0219615 A1* | 7/2020 | Rabin | A61H 1/00 |

* cited by examiner

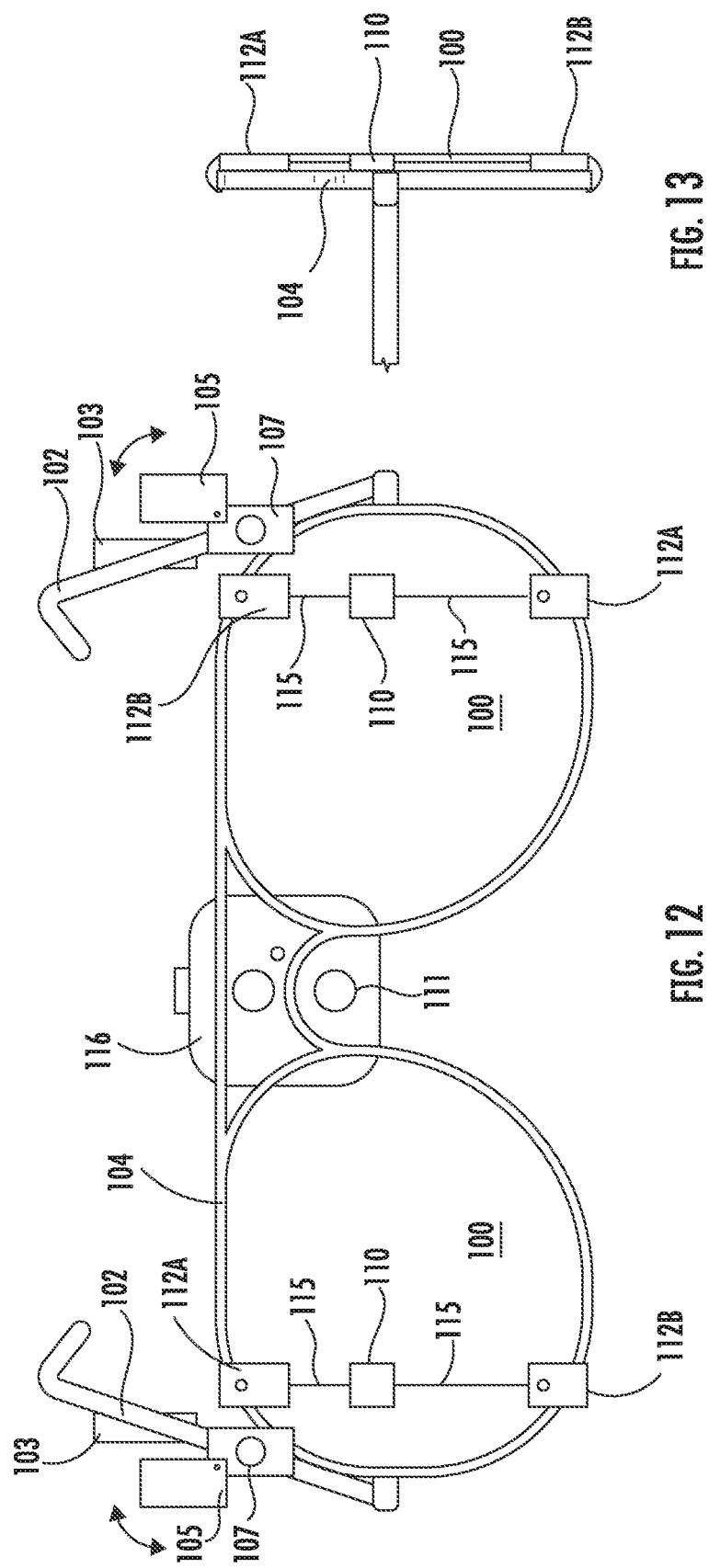

SYSTEM, METHOD, AND APPARATUS FOR THERAPY AND COMPUTER USAGE

FIELD

This invention relates to the field of therapy and more particularly to a system for providing therapy to a user.

BACKGROUND

There are many conditions in which a person becomes agitated and upset. For many, these conditions are from normal day-to-day stress or other abnormal situations, usually beyond that person's control.

There are many people who suffer from ADHD (Attention Deficit Hyperactive Disorder), Tourette syndrome, Autism, as well as many other individuals with disabilities who are affected by sensory, focus, behavioral, emotional, organizational, social and anxiety issues. Various conditions, disorders, illnesses, or the like, tend to elevate the level of agitation and stress of the individual, sometimes with little external triggering. Take for example Autism. Actually, there are three different types of Autism: Autistic disorder, which is what many think of; Asperger Syndrome, and Pervasive Developmental Disorder—Not Otherwise Specified (PDD-NOS). Those affected by Autism often perform repetitive movements such as rocking. In some case, those affected by Autism will perform activities that cause self-harm, such as banging their head on an object such as a wall, biting others, etc. Some of those affected with Autism have difficulty interacting with others and difficulty learning. Some learn very well, but have trouble communicating and applying what they know to everyday life and social situations.

People that are affected with certain conditions often have stress, panic attacks, emotional breakdowns, etc., exacerbated by their condition. When such occurs, it has been found helpful to distract the affected person from the stress and soothe the person until the stress abates.

Also, people that are affected with certain conditions often have difficulty using input and output devices that are designed for those not having such conditions. For example, it is difficult to use a mouse input device or a stylus input device when ones hand moves in an uncontrolled fashion.

In addition, when interacting with virtual reality systems, many users get confused or anxious when they touch or hold a virtual object and do not receive any tactile feedback or resistance from the object. For example, when grasping a virtual object, one can close their hand completely as if the object isn't there or when touching a virtual wall, one does not know exactly when they touch the wall and nothing limits the user from moving their hand through the wall.

What is needed is a system that will help those affected by these conditions and others.

SUMMARY

One aspect of the present invention is soothing a person, for example, when that person is under stress. One way to do such is to stroke the person's arm by a body-worn device, as in one embodiment, performed by a series of vibration emitting devices that vibrate in a pattern that simulates such stroking, though any other device that simulates such stroking is anticipated. In such, it is preferred, though not required, that the body-worn device include sensors that detect when the person is under stress and, responsive to detecting that the person is under stress, automatically initiating this stroking.

Other aspects of the present invention include various input/output devices that help certain individuals communicate with computer-based systems such as computers, televisions, smartphones, etc.

Other aspects of the present invention include limiting devices and resistance devices that work against a wearer's muscles and joints to increase the realism of virtual reality.

In some embodiments, software presents a questionnaire to the user for assessment then, as the wearer becomes stressed, the software uses sensory inputs to determine the root cause of what is triggering the wearer's stress and offers the most effective solution by therapy, action plans, and social skills suggestions. This is useful for individuals with disabilities but also for anyone in any kind of stressful situation such as professional working environments and more. In some embodiments, the wearer is enabled to conduct work while standing, walking, indoors and outdoors, etc. as opposed to conventional methods such as sitting in front of computer for hours on end.

In one embodiment, a body-worn device is disclosed including a substrate that is made of a flexible material and has therein two or more sensation emitting devices (e.g. vibrators). In such, a selective operation of each sensation emitting device of the plurality of sensation emitting devices provides a sensation for soothing a wearer of the body-worn device.

In another embodiment, a method of soothing a wearer of a body-worn device is disclosed including detecting an emotional state of the wearer of the body-worn device and based upon the emotional state, energizing each of a plurality of sensation emitting devices of the body-worn device in a pattern.

In another embodiment, a body-worn glove is disclosed including a substrate made of a flexible material and having two or more sensation emitting devices integrated there within. At least one sensor and a processor is integrated into the substrate. The processor is operatively coupled to each of the sensation emitting devices and to each of the at least one sensor. Software running on the processor causes the processor to read data from each or the at least one sensor, to analyze the data, to calculate an emotional state, and responsive to the emotional state, to selectively energize each of the sensation emitting devices.

BRIEF DESCRIPTION OF THE DRAWINGS

The invention can be best understood by those having ordinary skill in the art by reference to the following detailed description when considered in conjunction with the accompanying drawings in which:

FIGS. 12 and 13 illustrate elevational views of a heads-up-display of the body-worn device with stress-reducing features.

DETAILED DESCRIPTION

Figure 1:
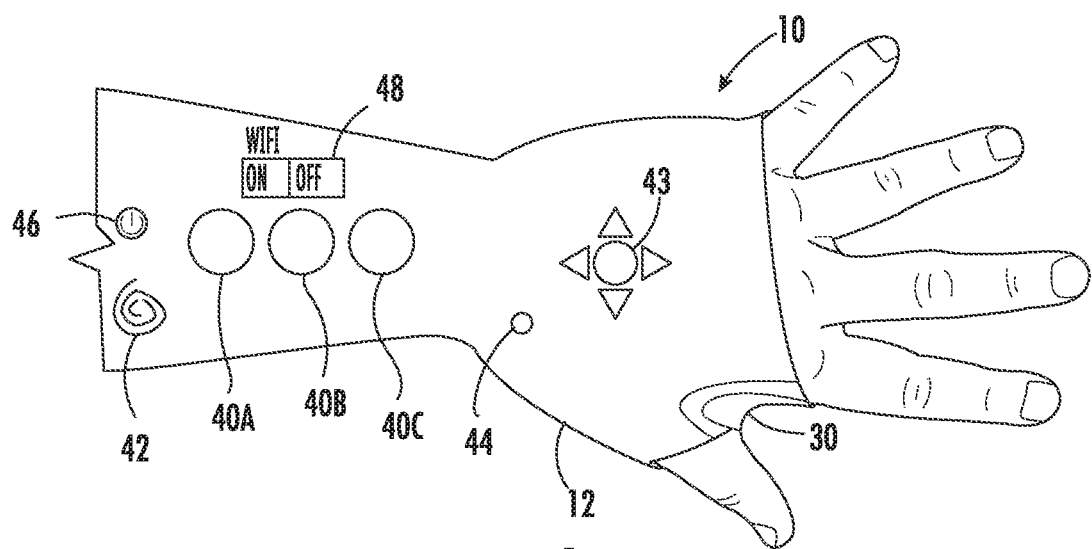
FIG. 1 illustrates a plan view of a top-side of a body-worn device with stress-reducing features.

Reference will now be made in detail to the presently preferred embodiments of the invention, examples of which are illustrated in the accompanying drawings. Throughout the following detailed description, the same reference numerals refer to the same elements in all figures.

Figure 2:
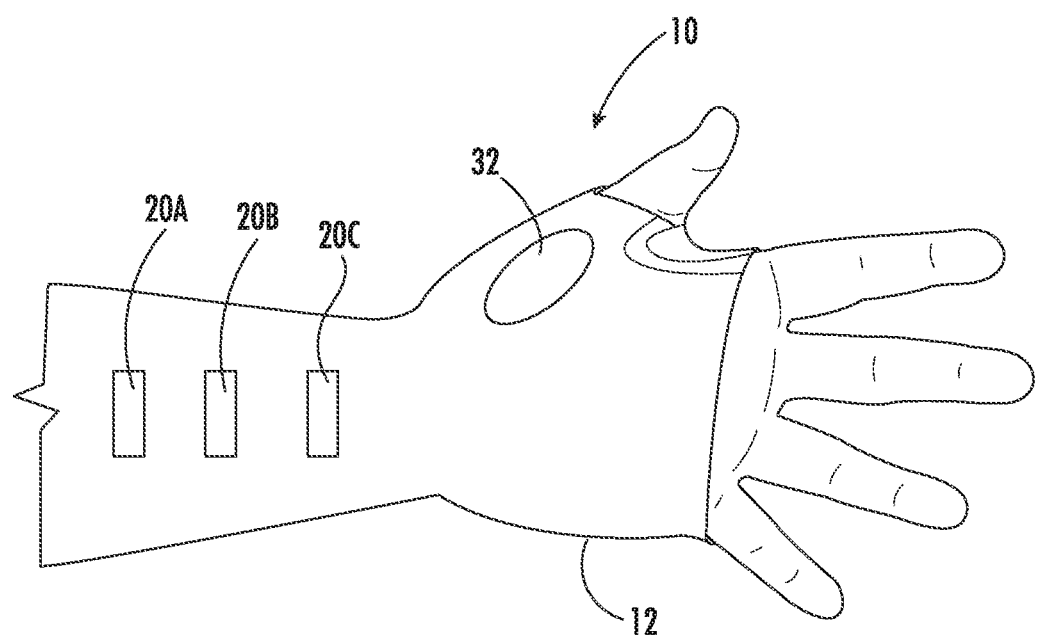
FIG. 2 illustrates a plan view of a bottom-side of the body-worn device with stress-reducing features.
Figure 4:
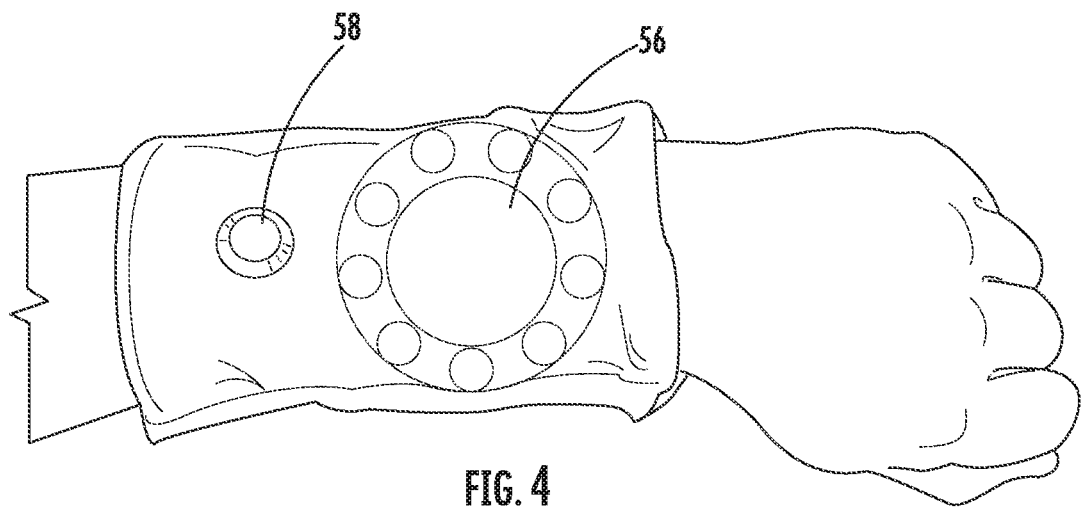

Referring to FIGS. 1 and 2, plan views of a top-side (FIG. 1) and a bottom-side (FIG. 2) of a body-worn device with stress-reducing features 10 are shown. Although the body-worn device with stress-reducing features 10 is shown in the form of a fingertip-less glove, the novel features of the body-worn device with stress-reducing features 10 are anticipated in any body-worn device such as a sleeve (e.g., as shown in FIG. 4), an arm band, a leg band, shirts, pants, underwear, a full body suit, etc.

In FIG. 1, the top-side of the body-worn device with stress-reducing features 10 is shown having a substrate 12 typically made of a flexible material. In the examples shown, the substrate 12 forms a glove or sleeve, though any form is anticipated. There several input/output features included in/on the substrate 12 such as a power button 46 (e.g. for conserving battery power), a speaker 42 for emitting sound, a wireless (e.g. Wi-Fi) on/off switch 48, a multi-directional switch 43, a microphone 44 for receiving voice input, and a purlicue switch 30 (the space between the thumb and index finger is called Purlicue). Also shown are three connectors 40A/406/40C for attaching various input/output devices as will be described in FIGS. 3 through 6. Although three connectors 40A/406/40C are shown, any number of connectors 40A/406/40C are anticipated, including zero and one.

In FIG. 2, the bottom-side of the body-worn device with stress-reducing features 10 is shown having a continuation of the substrate 12, again, typically made of a flexible material. On the bottom-side of the body-worn device with stress-reducing features 10 is a thenar switch 32 (the fatty part of the thumb is known as the thenar). In conjunction with the purlicue switch 30, the thenar switch 32 detects how an elongated object 74 such as a pencil (see FIGS. 6 through 8) is held as will be described.

In this embodiment, the bottom-side of the body-worn device with stress-reducing features 10 includes a soothing device that includes three electro-mechanical sensation emitting devices 20A/206/20C, though any number of two or more sensation emitting devices 20A/206/20C is anticipated. As will be described, in some embodiments, the sensation emitting devices 20A/206/20C are energized in patterns that simulate a soothing gesture across the skin of the wearer, simulating, for example, being rubbed. In some embodiments, the sensation emitting devices 20A/206/20C are vibrating devices such as a small motor having an offset weight mounted to the motor's shaft or a piezo-electric vibrating device. In some embodiments, the sensation emitting devices 20A/206/20C are more elaborate, consisting of, for example, inflatable bladders or actuator-driven tensioning devices that exert small amounts of pressure onto the skin of the person wearing the body-worn device with stress-reducing features 10. The sensation emitting devices 20A/206/20C are energized in patterns such as sequentially or randomly, with or without ramping up/down of intensity and with or without overlapping of two or more sensation emitting devices 20A/206/20C being energized at the same time. The pattern, intensity, and sequence timing are configured to respond to the wearer's current state, for example, as determined from reading and analyzing one or more biological sensors.

Figure 3:
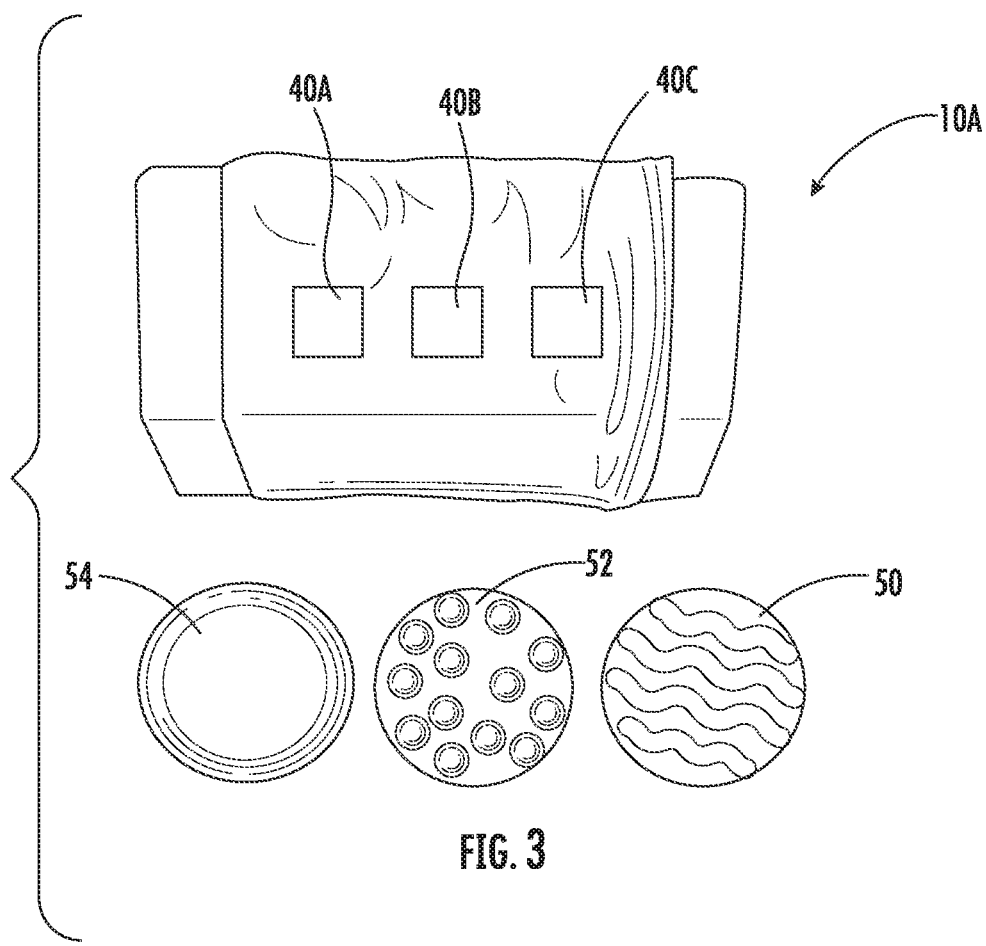
FIGS. 3, 4, and 5 illustrate input/output devices of the body-worn device with stress-reducing features.
Figure 5:
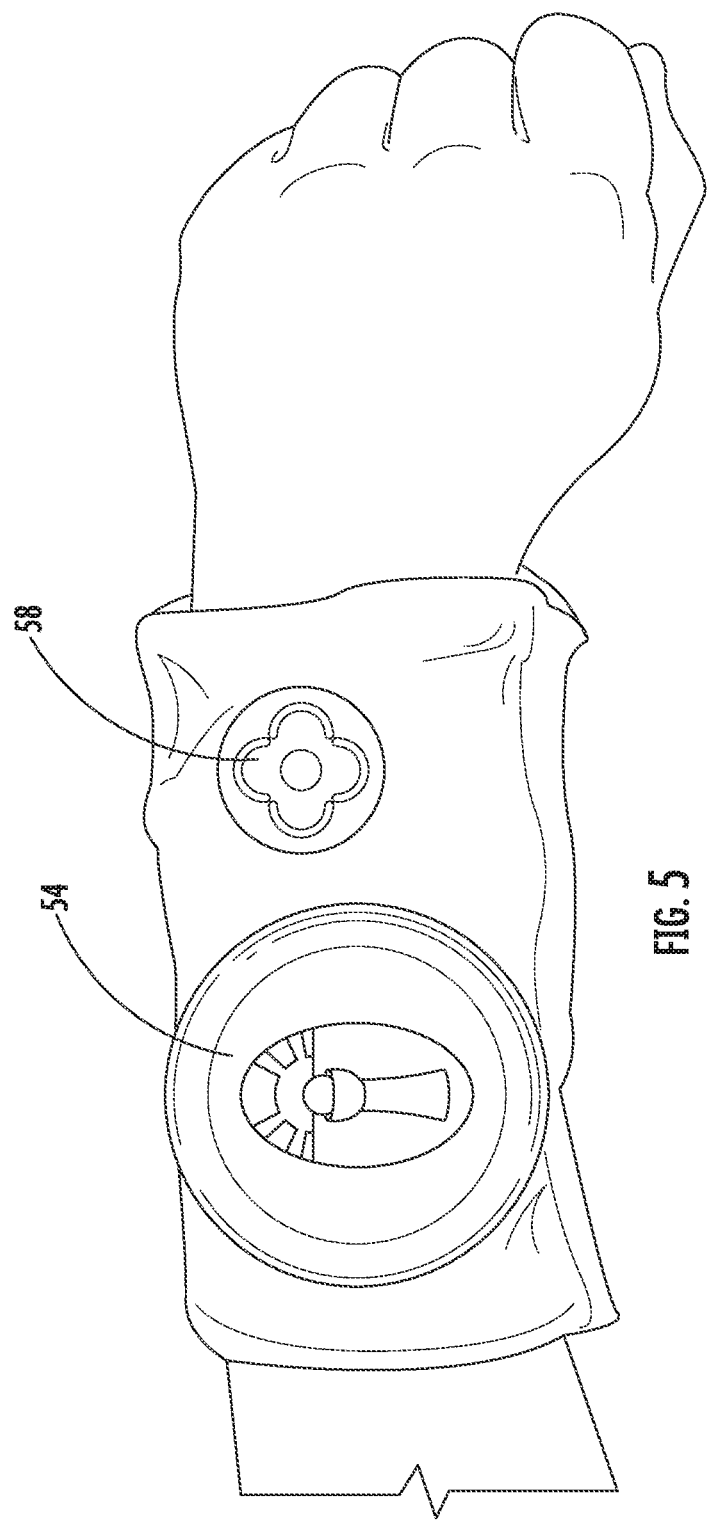

Referring to FIGS. 3, 4, and 5, input/output devices of the body-worn device with stress-reducing features 10 are shown. As discussed, there are three connectors 40A/406/40C for attaching various input/output devices. Again, although three connectors 40A/406/40C are shown, any number of connectors 40A/406/40C are anticipated, including zero and one. Any of a plurality of accessories 56/58 (optional devices) are anticipated for connecting to any of the connectors 40A/406/40C, in any order and/or configuration. As shown in FIG. 3, an embodiment of the body-worn device with stress-reducing features 10A (this embodiment lacks partial finger tips) has three connectors 40A/406/40C, ready to accept any accessory 56/58 such as a graphics display 56 (and touch-sensitive input) and a switch 58 (with or without illumination such one or more LEDs) that is either a push button switch or a joystick-like device for controlling, for example, a cursor. The accessories 56/58 are connected to the connectors 40A/406/40C in any order. Various tactile covers 50/52/54 are anticipated to cover the graphics display 56. The covers 50/52/54 provide tactile coverings so that the wearer feels different tactile surfaces when engaging with the graphics display 56. Some accessories 56/58 are input/output having graphics displays, touch screens, buttons, lights (LEDs), etc. Similar or different covers 50/52/54 are anticipated for other types of accessories In FIG. 4, two accessories 56/58 are shown connected to two connectors 40A/40C of this embodiment of the body-worn device with stress-reducing features 10A. In this, for example, the first accessory 58 is a simple push-button and the second accessory 56 is a graphics display surrounded by a series of LEDs, each of the LEDs capable of independent illumination. In some embodiments, it is anticipated that each LED 57 be touch sensitive as well.

In FIG. 5, two accessories 54/58 are shown connected to two connectors 40A/40C of this embodiment of the body-worn device with stress-reducing features 10A. In this, for example, the first accessory 58 is a simple push-button with a certain surface design and the second accessory 56 is a graphics display showing an icon of a flashlight.

Figure 6:
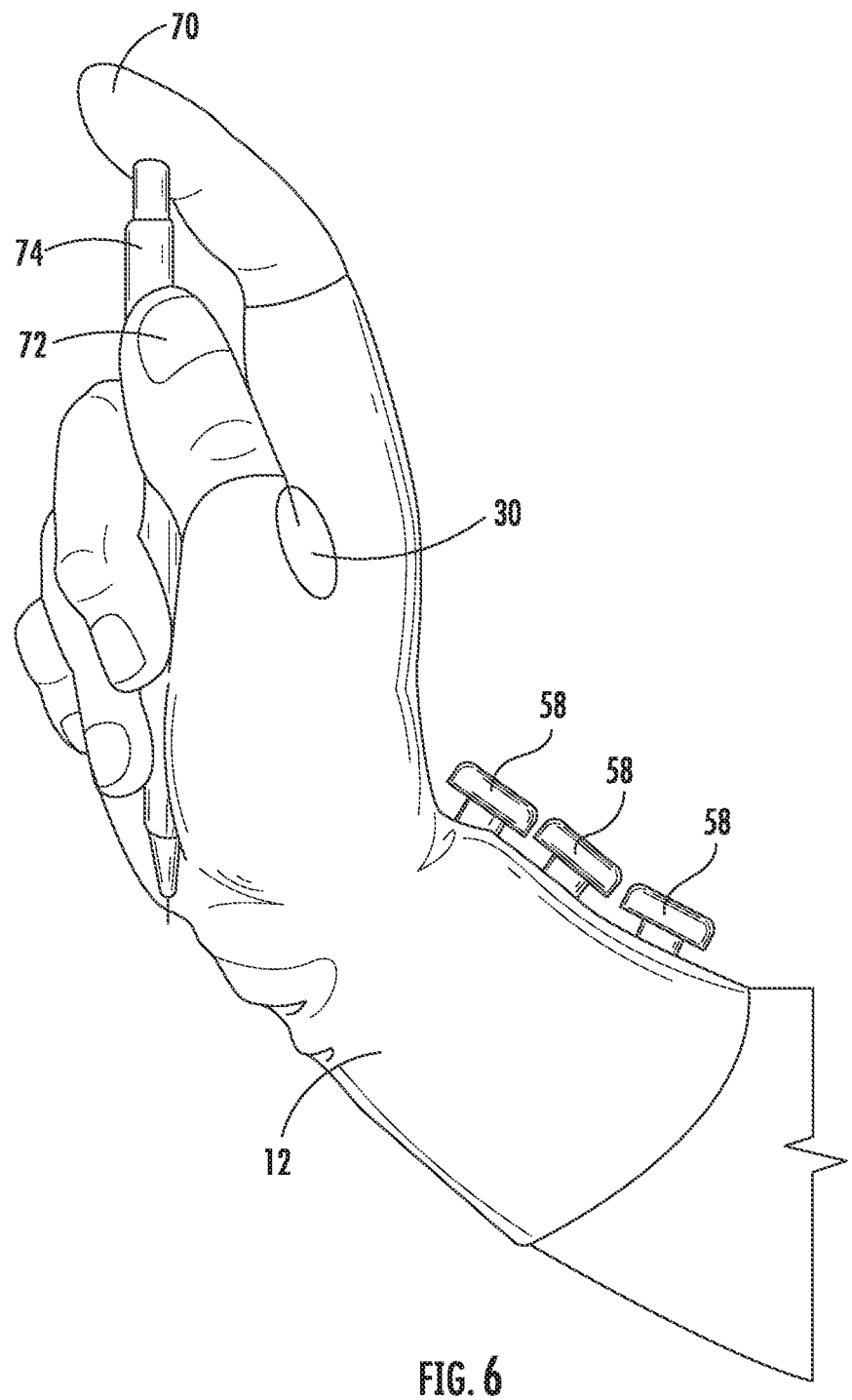
FIGS. 6, 7, and 8 illustrate elevational views of the body-worn device with stress-reducing features used as a pointing device.
Figure 7:
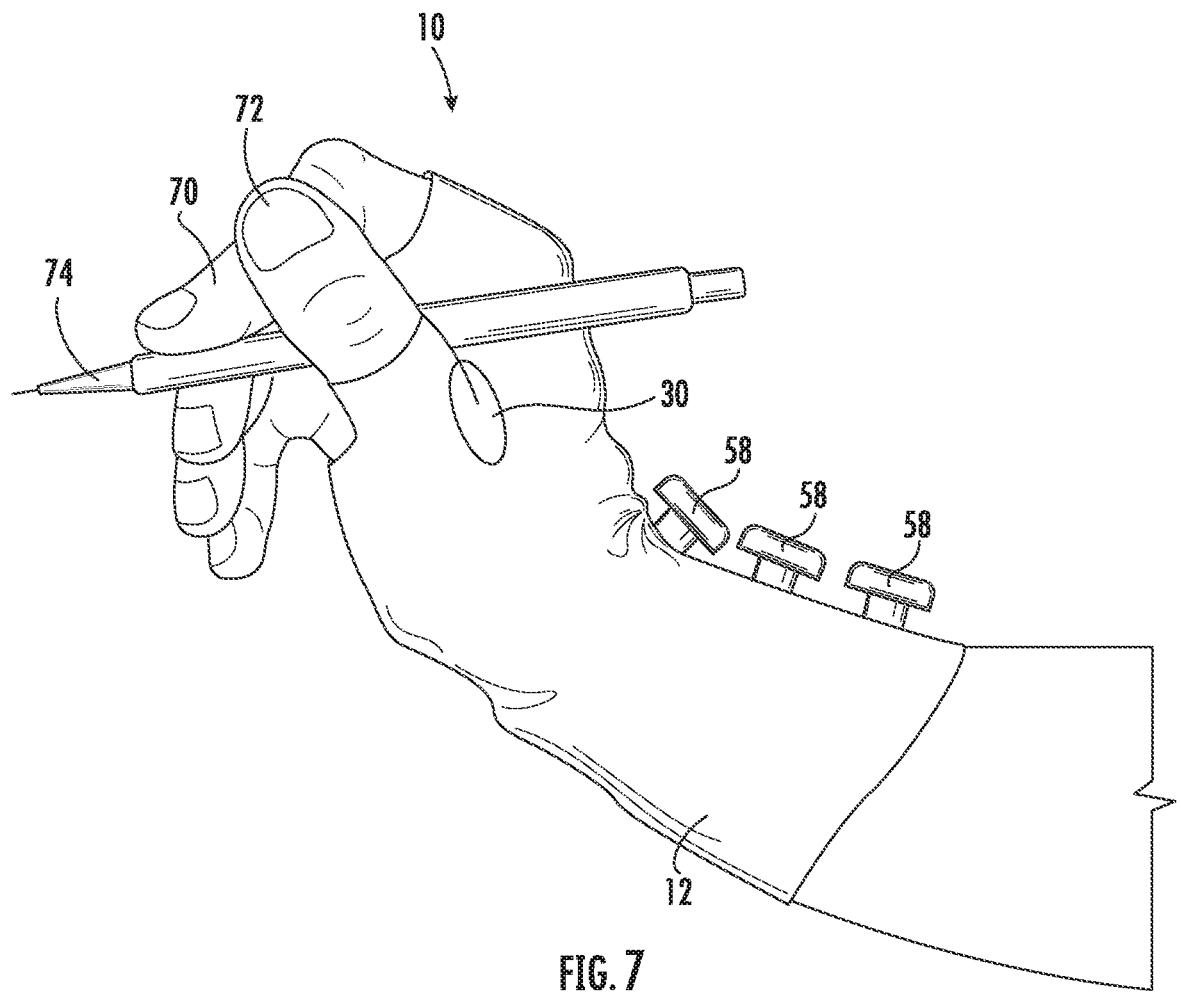
Figure 8:
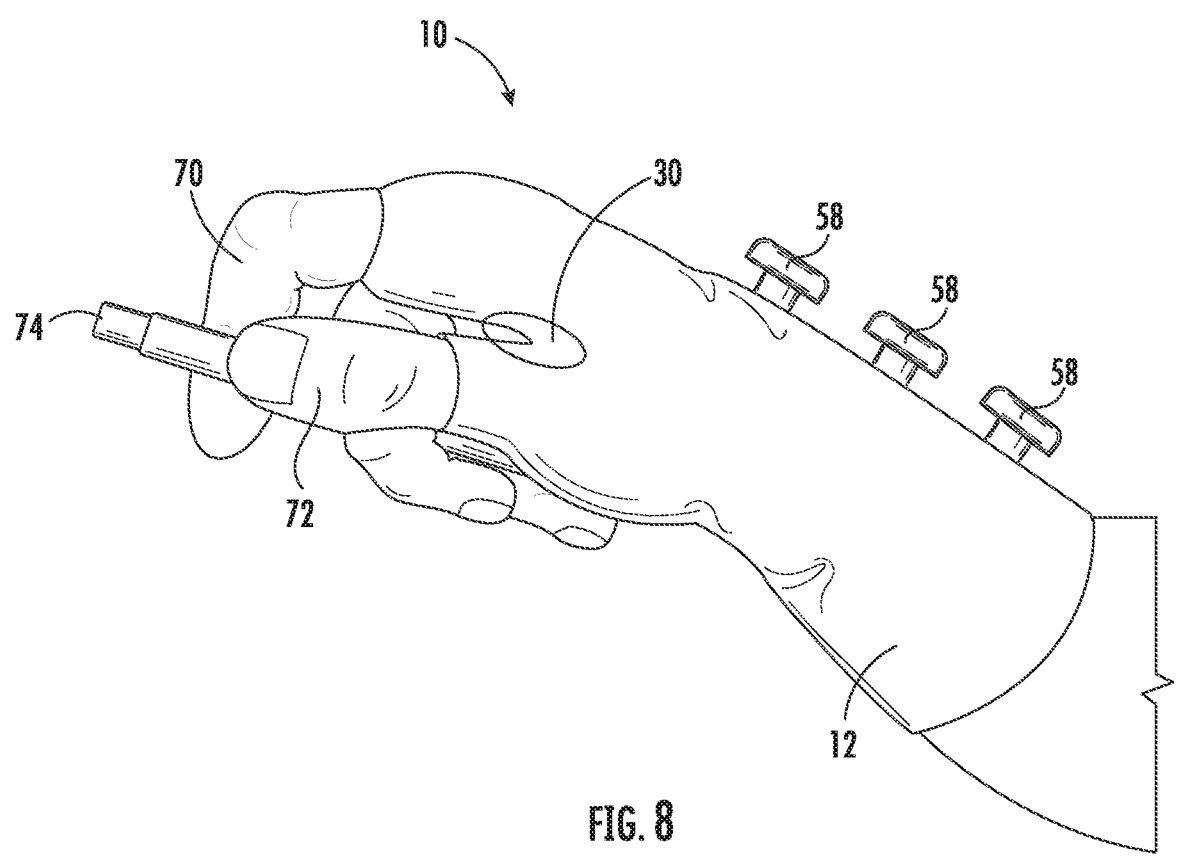

Referring to FIGS. 6, 7, and 8, elevational views of the body-worn device with stress-reducing features 10 used as a pointing device are shown with respect to an elongated object 74, for example, using an artistic paint software application. In FIG. 6 the wearer is holding an elongated object 74 (e.g. a mechanical pencil) in an upright mode between a thumb 72 and finger 70. In this configuration, the elongated object 74 is not touching the purlicue switch 30 and, therefore, not registering pressure on the purlicue switch 30. Although not visible, the elongated object 74 is touching the thenar switch 32 at the fatty part of the thumb 72 and, therefore registering pressure on the thenar switch 32. In this combination of the thenar switch 32 and the purlicue switch 30, the processor 570 (see FIG. 15) ascertains that the wearer is holding the elongated object 74 as a spray paint can and, therefore signals to use an airbrush brush tip.

In FIG. 7 the wearer is holding an elongated object 74 (e.g. a mechanical pencil) by a thumb in a writing mode. In this configuration, the elongated object 74 is touching the purlicue switch 30 and, therefore, registering pressure on the purlicue switch 30. Although not visible, the elongated object 74 is also touching the thenar switch 32 at the fatty part of the thumb 72 and, therefore registering pressure on the thenar switch 32. In this combination of the thenar switch 32 and the purlicue switch 30, the processor 570 (see FIG. 15) ascertains that the wearer is holding the elongated object 74 as a writing implement and, therefore signals to use a focused (e.g. pen) brush tip.

In FIG. 8 the wearer is holding an elongated object 74 (e.g. a mechanical pencil) between a thumb and finger 70 in a pointing mode. In this configuration, the elongated object 74 is not touching the purlicue switch 30 and, therefore, not registering pressure on the purlicue switch 30. Although not visible, the elongated object 74 is touching the thenar switch 32 at the fatty part of the thumb 72 and, therefore registering pressure on the thenar switch 32. In this combination of the thenar switch 32 and the purlicue switch 30, and possibly monitoring the gyroscopic sensor 541, the processor 570 (see FIG. 15) ascertains that the wearer is holding the elongated object 74 as a paintbrush and, therefore signals to use a paint brush tip.

As such, the wearer is able to quickly change back and forth between brush styles without having to maneuver a user interface that is normally required to change between brush type is a typical artistic paint software application.

In some embodiments, one or both of the thenar switch 32 and the purlicue switch 30 are also used as a selecting device (e.g. mouse click).

Figure 9:
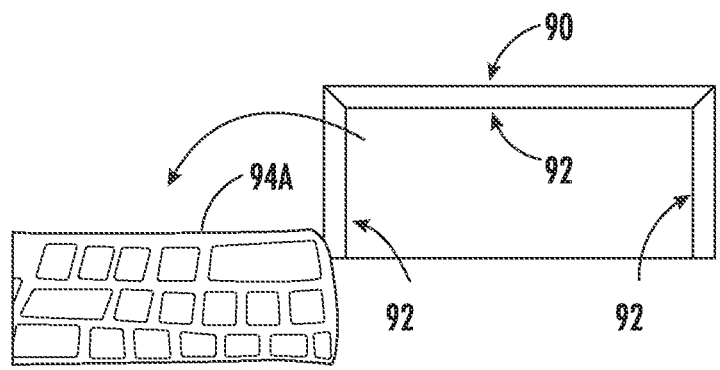
FIGS. 9, 10, and 11 illustrate a plan view of a foldable keyboard of the body-worn device with stress-reducing features.
Figure 10:
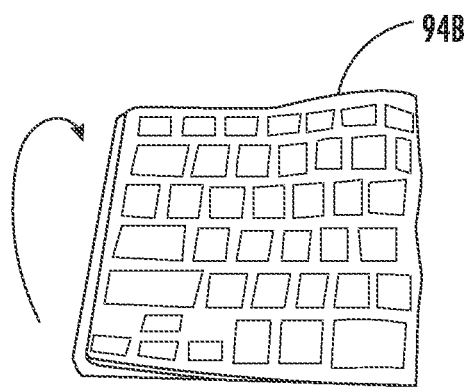
Figure 11:
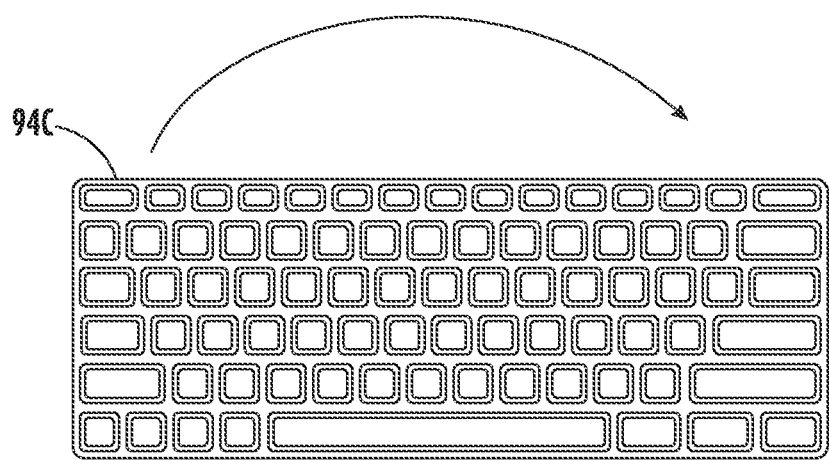

Referring to FIGS. 9, 10, and 11, a plan view of a foldable keyboard of the body-worn device with stress-reducing features 10 are shown. In FIG. 9, this exemplary keyboard 94A is shown folded and coming out of a carrying case 90 where it was tucked under overlapping flanges 92 when not in use. In FIG. 10, the foldable keyboard 94B is partially unfolded and in FIG. 11, the foldable keyboard 94C is completely unfolded and ready for use.

Referring to FIGS. 12 and 13, elevational views of a heads-up-display of the body-worn device with stress-reducing features 10 are shown. In this, a user's eyeglasses 100/102/104 has been outfitted with one or more cameras 107 and displays 110.

In some embodiments, the heads-up-display of the body-worn device with stress-reducing features 10 includes a flash 109 (e.g., high-intensity LED) and an LED indicator 111 (e.g. a red LED) that warn those who are with the wearer that the camera(s) 107 are active. In some embodiments, side cameras 107 are mounted on the frame 104. In some such embodiments, a rotatable cover 105 is provided to protect the wearer's privacy (e.g. rotate the rotatable cover 105 down to shut off the side camera 107 and block the lens and rotate the rotatable cover 105 up to expose the lens and turn on the side camera 107).

In embodiments with the display(s) 110, each display 110 is positioned on the glasses lenses 100 at a location within the wearer's focus so that the wearer is able to turn their eyes towards the display 110 and see an image. In some embodiments, each display 110 is connected to guides 115 (e.g. resilient or not resilient) that are anchored to the frame 104 by anchors 112A/112B, the resiliency of such hold the displays 110 to the frame 104. The display(s) 110 is/are removable (e.g. for storage in a carrying case) and adjustable to any location on the glasses lenses 100. Note that in some embodiments, the resiliency comes from spring-biased spools that take up the guides 115 within one or both of the anchors 112A/112B. The display(s) 110 is/are removable (e.g. for storage in a carrying case) and adjustable to any location on the glasses lenses 100. In some such embodiments, when the display(s) 110 is/are removed, as the guides are spooled into the anchors 112A/112B, the display(s) 110 are pulled into the anchors 112/112B for safe storage. In some embodiments, when not attached to a frame 104, all connections retract to collapse all of the components 110/112A/112B/103/107 into a single device for storage and transport.

Referring to FIG. 14, a tactile feature of the body-worn device with stress-reducing features 10 is shown. One aspect of the disclosed invention is using the body-worn device with stress-reducing features 10 as an input/output device for a device such as a computer or smartphone. In many usage scenarios, the wearer is participating in virtual reality, touching or moving objects that exist only in a virtual world as, for example, presented using the heads-up display shown in FIGS. 12 and 13.

In some embodiments, the body-worn device with stress-reducing features 10 includes sensors (see FIG. 15) that determine position of the body-worn device with stress-reducing features 10, for example, a location is determined by reading the global positioning system 591, an angle at which a hand of the wearer is turned (e.g. orientation with respect to the horizon) is sensed using a gyroscopic sensor 541, speed of motion of the body-worn device with stress-reducing features 10 is sensed using an accelerometer, and height (altitude) is sensed using a barometric sensor 550. By analyzing readings (data) from these sensors (and any other sensor available to the body-worn device with stress-reducing features 10) a location, angle, trajectory, speed, of the body-worn device with stress-reducing features 10 is calculated. In some embodiments, this data and/or the analysis results are transmitted to the device (e.g., a computer or smartphone) for control of that device.

Now, in a virtual reality scenario, this data and/or the analysis results are transmitted to a remote system (e.g., a virtual reality computer) for control of the virtual environment that is presented to the wearer (e.g. virtual reality presented using heads-up display shown in FIGS. 12 and 13). In many virtual reality systems, the user is able to touch virtual objects, hit virtual objects, move virtual objects, grasp virtual objects, etc. Being that this is virtual reality, these virtual objects have no mass and, therefore, there is no feedback to the wearer as the wearer interacts with these objects. For example, if a wearer grabs a virtual tomato and squeezes this virtual tomato, there is no tactile feedback telling the wearer that this is a real, ripe tomato (e.g. one that gives under slight pressure) or that this is a plastic, artificial tomato (e.g. on that is hard and does not compress under pressure).

Figure 14A:
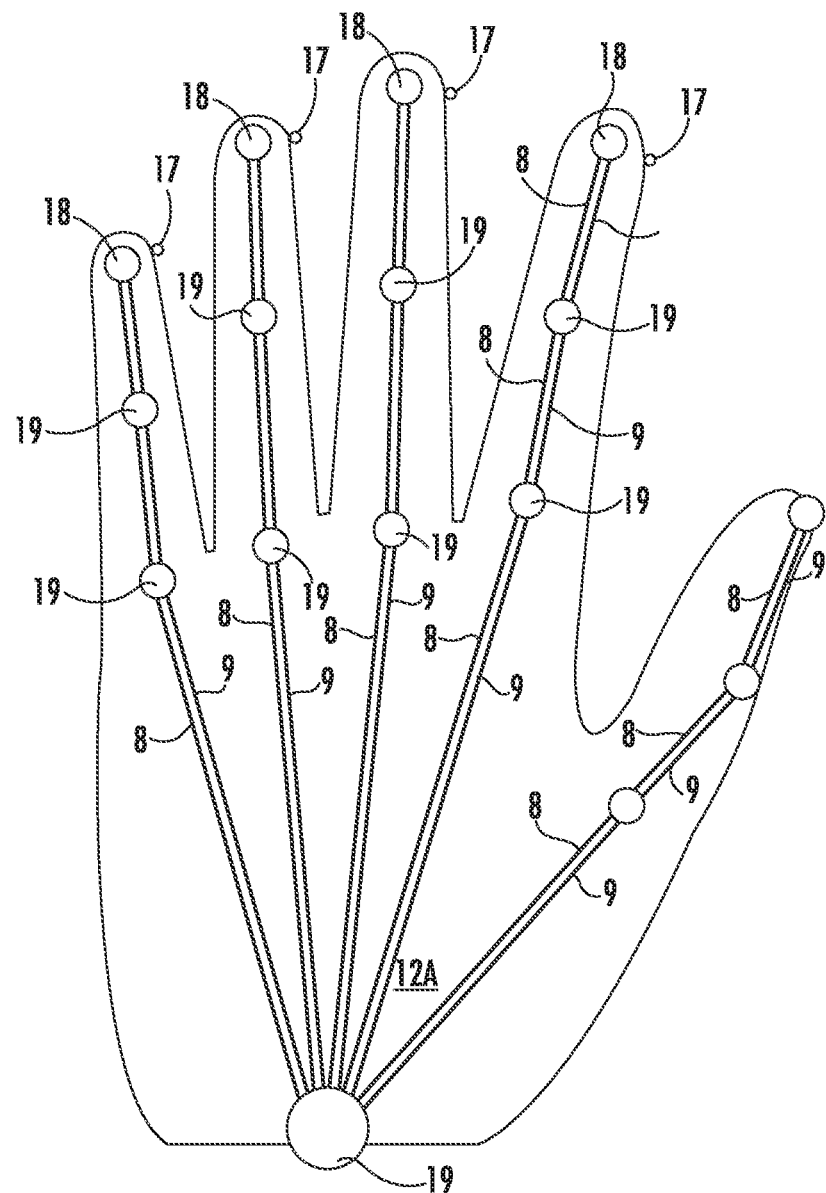
FIGS. 14A, 14B, and 14C illustrate a tactile feature of the body-worn device with stress-reducing features.

To overcome this deficiency of virtual reality, in some embodiments of the body-worn device with stress-reducing features 10, several elements combine to provide tactile feedback to the wearer as the wearer interacts with virtual objects. For example, as shown in FIG. 14A, the body-worn device with stress-reducing features 10 includes a series of resilient linkages 8, non-resilient linkages 9, and motor-driven tensioning devices 19. As the wearer grasps or touches a virtual object, data regarding the object (e.g. from a remote system) is used to control one or more of the motor-driven tensioning devices 19 provide either a limit to how much one can bend a finger (or arm, etc.) or resistance to bending a finger (or arm, etc.). In the example above of the tomato, if the virtual tomato is soft, then the resilient linkages 8 are tensioned depending upon how soft the virtual tomato would feel. If the virtual tomato is hard (e.g. plastic), the non-resilient linkages 9 are tensioned to not allow the wearer to close their fingers any further than when their fingers contact the virtual tomato, as if the virtual tomato was a real, plastic tomato, one could not close their fingers around such any more than the edge of the tomato without, possibly, breaking the plastic tomato.

Figure 14B:
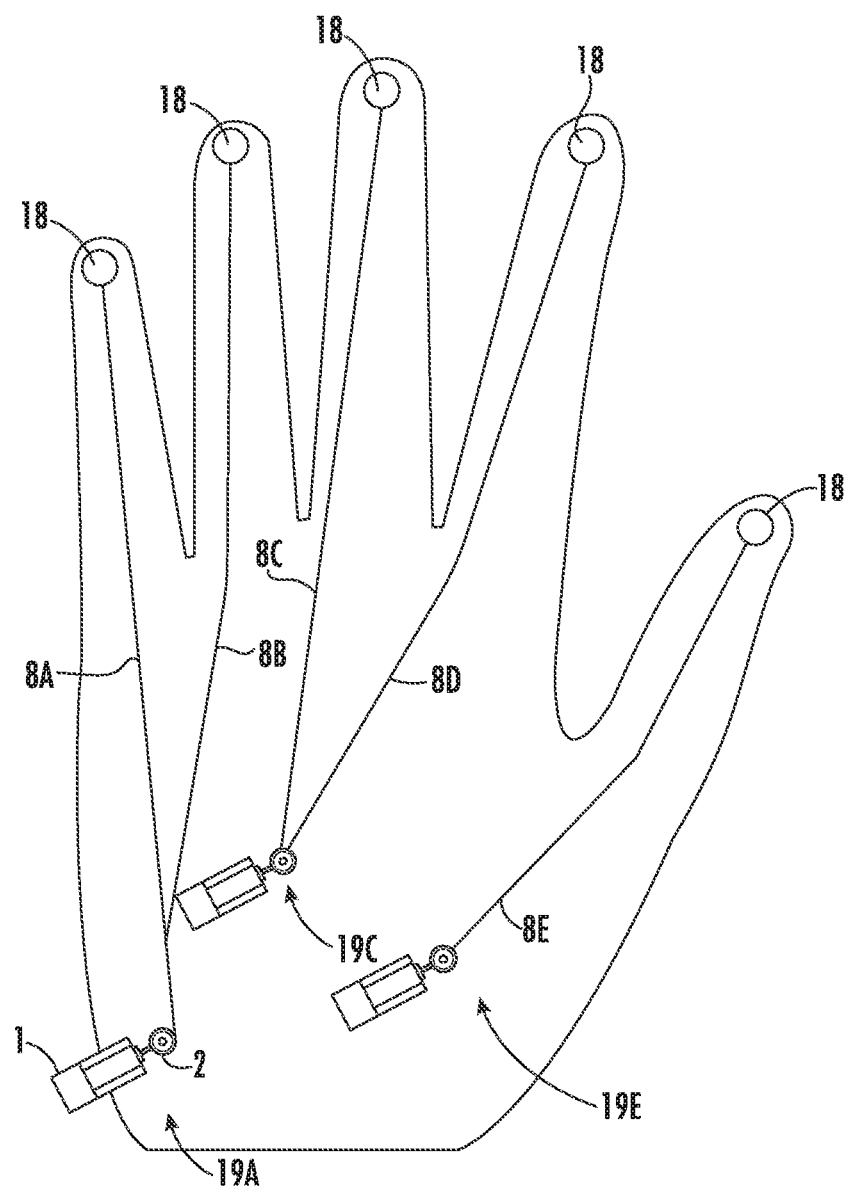
Figure 14C:
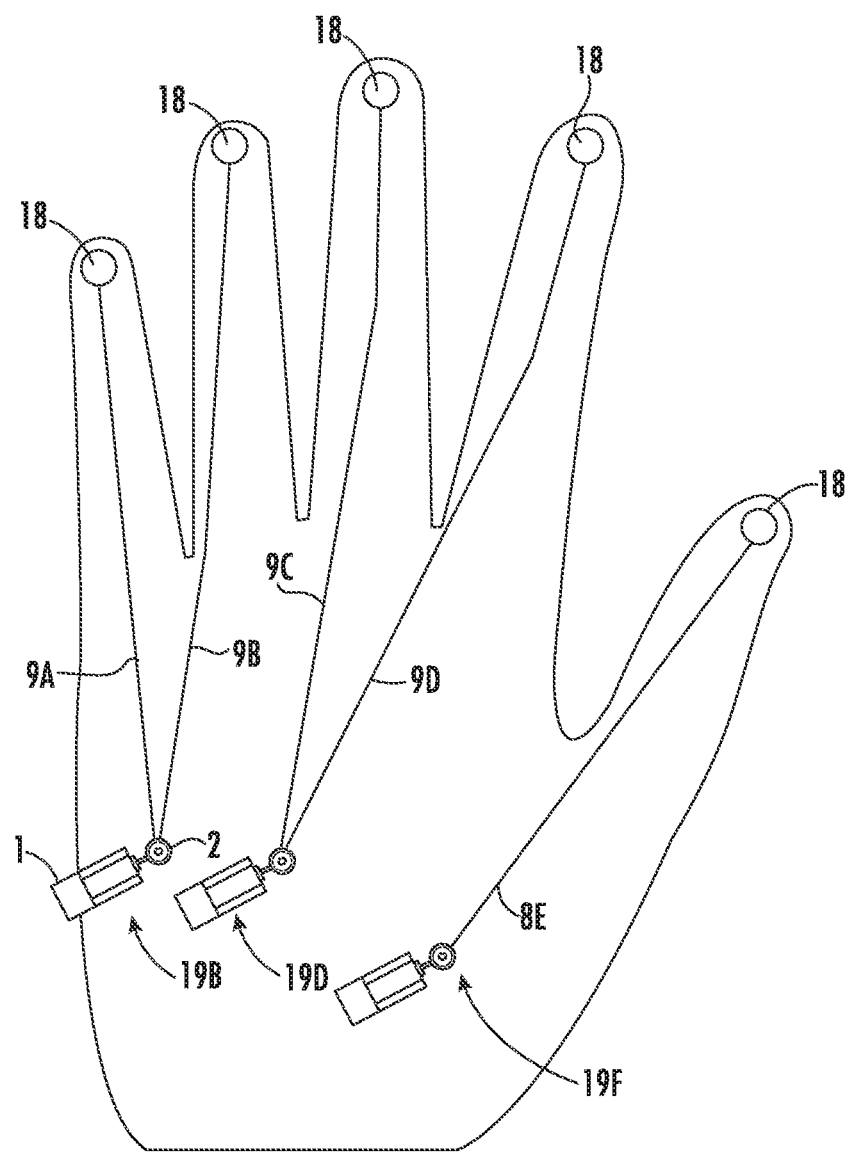

In some embodiments, each finger has resilient linkages 8 that are independently tensioned and non-resilient linkages 9 that are also independently tensioned as shown in FIG. 14A and in some embodiments certain fingers are grouped for common tensioning as shown in FIGS. 14B and 14C. In such, the pinky and fourth finger are controlled by a first set of tensioning devices 19A/19B (one tensioning device 19A for the resilient linkages 8A/8B and one tensioning device 19B for the non-resilient linkages 9A/9B); the middle finger and index finger are controlled by a second set of tensioning devices 19C/19D (one tensioning device 19C for the resilient linkages 8C/8D and one tensioning device 19D for the non-resilient linkages 9C/9D); and the thumb is controlled by a third set of tensioning devices 19E/19F (one tensioning device 19E for the resilient linkage 8E and one tensioning device 19F for the non-resilient linkages 9E). In the example shown in FIGS. 14B and 14C, each set of tensioning devices 19A/19B/19C/19D/19E/19F includes two spools 2, one spool 2 around which the resilient linkages 8A/8B/8C/8D/8E are interfaced and another spool 2 around which the non-resilient linkages 9A/9B/9C/9D/9E are interfaced. Each of the spools 2 are each connected to a servo motor 1 or other electrical device for driving the spool 2. Note that it is fully anticipated that the motor-driven tensioning devices 19/19A/19B/19C/19D/19E/19F be any device capable of increasing/decreasing tension on the resilient linkages 8/8A/8B/8C/8D/8E and/or the non-resilient linkages 9A/9B/9C/9D/9E. For example, any type of actuator, pneumatic device, etc., is fully anticipated.

In some embodiments, a single resilient linkage 8 and/or non-resilient linkage 9 is connected between the motor-driven tensioning device 19 and the termination point 18 (e.g. at the finger tip) and routed by guides over each bone joint to provide overall finger bending resistance. In some embodiments, multiple segments of single resilient linkage 8 and/or non-resilient linkage 9 are connected between multiple motor-driven tensioning devices 19 and the termination point 18, providing adjustable tension and range limiting to each joint of each finger. It is also anticipated that the same resilient linkages 8 and/or non-resilient linkages 9 be provided for resistance against movement of other joints such as elbows, wrists, knees, ankles, etc., as needed.

Also, in some embodiments only resilient linkages 8 are provided while in some embodiments, only non-resilient linkages 9 are provided, in any combination to resist or prevent closing/opening of one or more joints. In some embodiments, resilient linkages 8 and/or non-resilient linkages 9 are provided on both sides of the joints to provide resistance and/or range limits to both opening and closing of the joints.

In some embodiments, one or more haptic emitters 17 are included to provide a sense that the wearer has made contact with a virtual object. Haptic technology, also known as kinesthetic communication, infers a sense of touch by applying forces, vibrations, or motions to the wearer. For example, as one starts to grasp the tomato, upon contact with the tomato, the haptic emitters 17 emit a vibration or tap telling the wearer that contact was made.

As discussed before, the disclosed some embodiments of the body-worn device with stress-reducing features 10 include other parts of the body such as arms, legs, torso, neck, etc., even a full-body body-worn device with stress-reducing features 10. The same technology described in FIGS. 14A through 14C are anticipated for any joint of the human body. For example, by including resilient linkages 8 and/or non-resilient linkages 9 around a wearer's elbows, coupled to multiple motor-driven tensioning devices 19, under software control, as the wearer lifts a virtual object, the weight of the virtual object is felt by tensioning of the resilient linkages 8 and/or non-resilient linkages 9.

Figure 15:
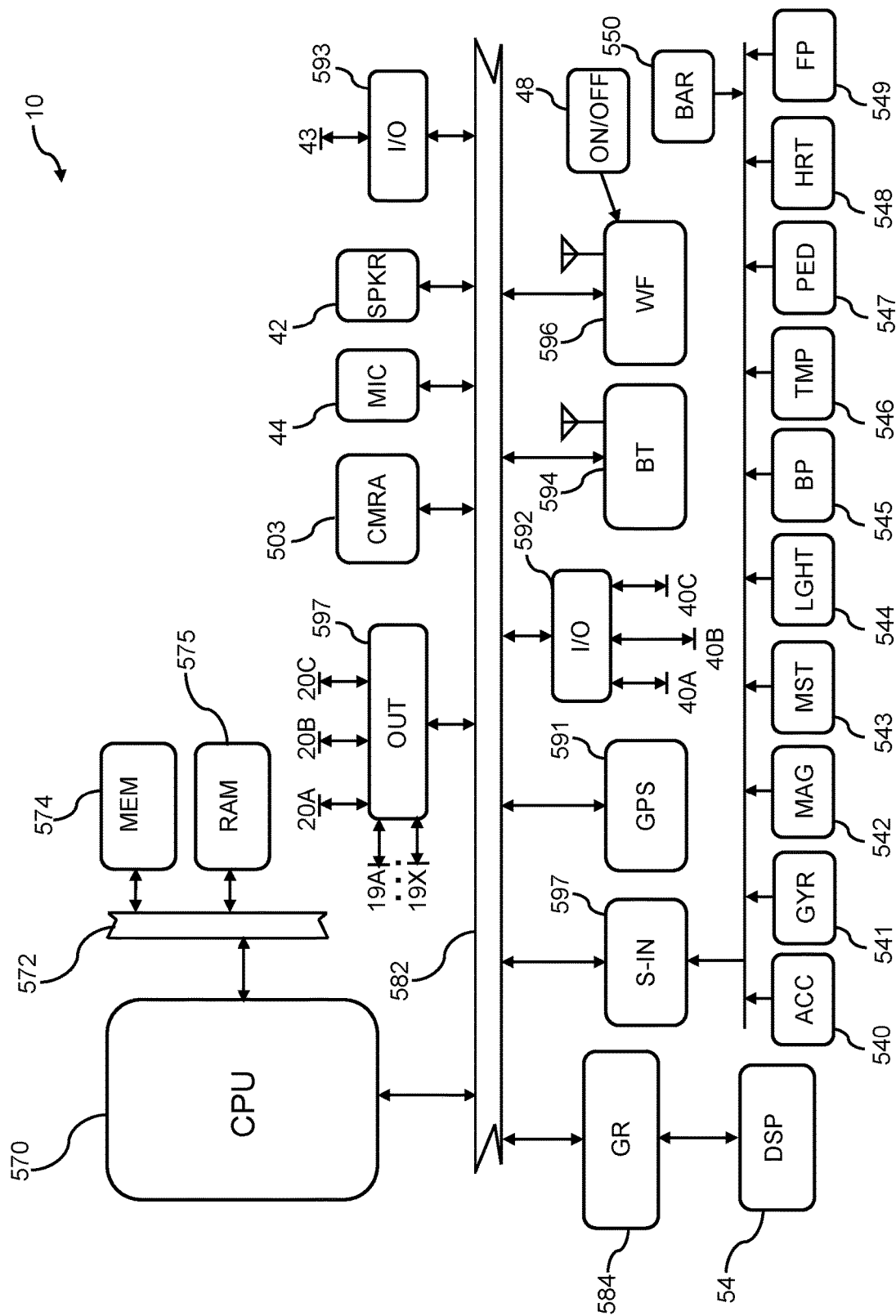
FIG. 15 illustrates a schematic view of the body-worn device with stress-reducing features.

Referring to FIG. 15, a schematic view of the body-worn device with stress-reducing features is shown. Note that although shown as a processor-based device, it is well known in the art to fabricate the same functionality utilizing digital logic, programmable field arrays, etc., and such implementations are fully anticipated.

This exemplary electrical implementation of the body-worn device with stress-reducing features 10 is shown in one embodiment. Different architectures are known that accomplish similar results in a similar fashion, and the present invention is not limited in any way to any system architecture or implementation. In this body-worn device with stress-reducing features 10, a processor 570 executes or runs programs loaded in a random-access memory 575. The programs are generally stored in persistent memory 574 and loaded into the random-access memory 575 when needed. The processor 570 is any processor, typically a processor designed for low-power operation. The persistent memory 574 and random-access memory 575 are connected to the processor by, for example, a memory bus 572. The random-access memory 575 is any memory suitable for connection and operation with the processor 570, such as SRAM, DRAM, SDRAM, RDRAM, DDR, DDR-2, etc. The persistent memory 574 is any type, configuration, the capacity of memory suitable for persistently storing data, for example, flash memory, read-only memory, battery-backed memory, etc. In some embodiments of the body-worn device with stress-reducing features 10, the persistent memory 574 is removable, in the form of a memory card of appropriate format such as SD (secure digital) cards, micro SD cards, compact flash, etc.

Also connected to the processor 570 is a system bus 582 for connecting to peripheral subsystems such as an optional graphics controller 584. In such embodiments, the graphics controller 584 receives commands from the processor 570 and controls what is depicted on the display accessory 54 (see FIG. 5) when attached to the body-worn device with stress-reducing features 10.

In general, some portion of the persistent memory 574 is used to store programs, executable code, and data, etc. In some embodiments, other data is stored in persistent memory 574 such as audio files, video files, text messages, etc.

The peripherals are examples, and include any devices known in the industry such as global positioning system 591 (GPS), speakers 42, USB interfaces, cameras 503, a microphone 44, a Bluetooth transceiver 594, a Wi-Fi transceiver 596 with on/off switch 48, an accelerometers 540, a gyroscopic sensor 541, a magnetic sensor 542 (e.g. for directional sensing), a skin moisture sensor 543, an ambient light sensor 544, a blood pressure sensors 545, a skin temperature sensors 546, a pedometers 547, a heart rate sensors 548, an $O_2$ sensor 549, a barometric sensor 550, etc. and including any sensor capable of detecting a physical, physiological, environmental, biometric, emotional, or activity of the wearer of the body-worn device with stress-reducing features 10 are anticipated. Such sensors are known in the industry and the details of which are not shown for brevity and clarity reasons.

For local communications, a Bluetooth transceiver 594, a Wi-Fi transceiver 596, or both are included in some embodiments. As some users believe radio waves impact their health or feelings, an on/off switch 48 is provided to turn on/off the Bluetooth transceiver 594, the Wi-Fi transceiver 596, or both under user control. The Bluetooth transceiver 594 and/or the Wi-Fi transceiver 596 provide data communications between the body-worn device with stress-reducing features 10 and local devices that are being used (e.g. a smartphone or computer system) as well as with the Internet.

Features of the body-worn device with stress-reducing features 10 are anticipated to be implemented in hardware, software or any combination thereof.

In one example of the body-worn device with stress-reducing features 10, a sensory device is the camera 503. For example, as the user wears the body-worn device with stress-reducing features 10, an image of the user that is looking into the camera 503 is captured and analyzed to determine if the user is experiencing an certain emotional state such as stress.

In some embodiments, the body-worn device with stress-reducing features 10 utilizes one or more sensory devices to determine a physical, emotional, and mental state of a wearer. The one or more sensory devices are, for example, an accelerometers 540, a gyroscopic sensor 541, a magnetic sensor 542 (e.g. for directional sensing), a skin moisture sensor 543, an ambient light sensor 544, a blood pressure sensors 545, a skin temperature sensors 546, a pedometers 547, a heart rate sensors 548, an $O_2$ sensor 549, and a barometric sensor 550. The body-worn device with stress-reducing features 10 accesses sensory data regarding the wearer by gathering data from one or more of the sensory devices 540/541/542/543/544/545/546/547/548/549/550, for example, to determine if the wearer is under stress.

In some embodiments, the physical, emotional, and mental state of the wearer are transmitted, e.g. using the Bluetooth transceiver 594 or the Wi-Fi transceiver 596 for analysis and monitoring, for example to a desk to computer or smartphone.

In some embodiments, one or more of the sensory inputs are analyzed locally by software running on the processor 570 to determine the physical, emotional, and mental state of the wearer. The physical, emotional, and mental state of the wearer are then used to control the sensation emitting devices 20A/20B/20C. For example, if the physical, emotional, and mental state of the wearer indicate that the wearer is under stress, the software running on the processor 570 controls the sensation emitting devices 20A/206/20C to operate sequentially to impart a soothing feeling to the wearer, for example, enabling the first soothing device 20A, then both the first soothing device 20A and second soothing device 20B, then only the second soothing device 20B, then both the second soothing device 20B and third soothing device 20C, then only the third soothing device 20C, then both the third soothing device 20C and first soothing device 20A, then only the third soothing device 20C, etc. It is also anticipated that, in embodiments in which the sensation emitting devices 20A/206/20C are analog (e.g. instead of on/off, have a range of intensity), the intensity of each of the sensation emitting devices 20A/206/20C is ramped up and/or ramped down gradually with or without overlap to better simulate a soothing motion.

In a more detailed scenario, the software running on the processor 570 monitors the wearer's skin moisture using data from the skin moisture sensor 543; the wearer's blood pressure using data from the blood pressure sensors 545; the wearer's skin temperature using data from the skin temperature sensors 546; the wearer's heart rate using data from the heart rate sensors 548; the wearer's oxygen saturation using data from the $O_2$ sensor 549, and an altitude (e.g. height of the wearer's hand) from the barometric sensor 550; in any combination. As the wearer becomes stressed or agitated, the wearer's heart rate increases, the wearer's breathing changes affecting $O_2$ levels, the wearer's skin temperature and moisture increase, and/or the wearer's blood pressure increases or decreases from normal. By analyzing this data, the software running on the processor 570 determines if the wearer is stressed and, if so, the software running on the processor 570 controls the sensation emitting devices 20A/206/20C (for example, as described above) to initiate soothing action until the software running on the processor 570 determines that the wearer's stressed has abated.

As discussed with FIGS. 14A and 14B, the processor 570 controls one or more motor-driven tensioning devices 19A-19X through an output port.

Figure 16:
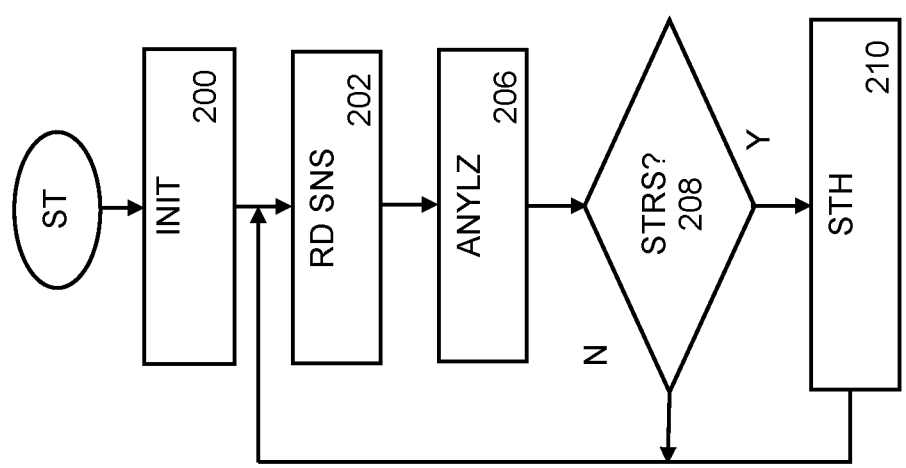
FIGS. 16 and 17 illustrate exemplary program flows of the body-worn device with stress-reducing features.
Figure 17:
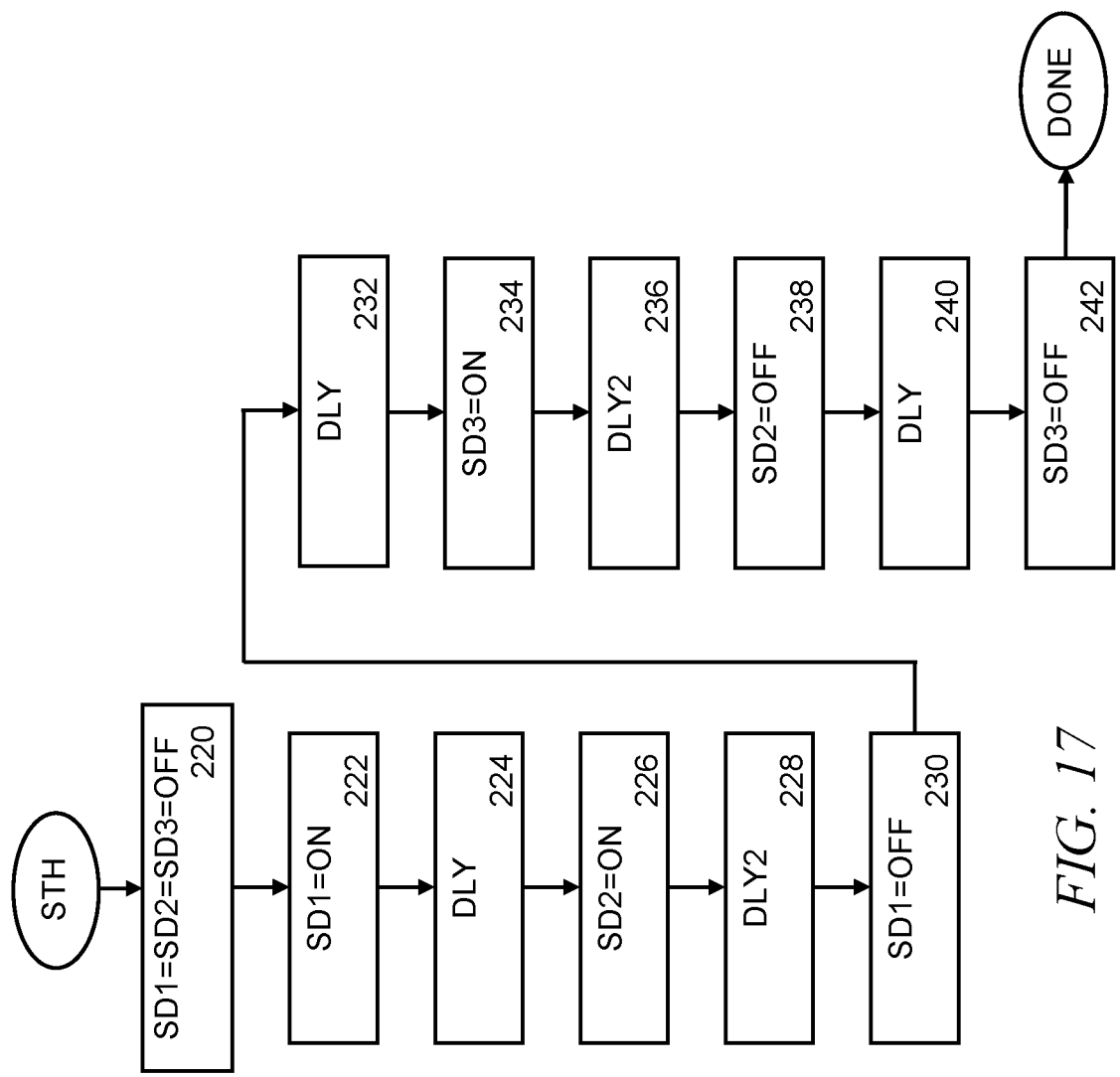

Referring to FIGS. 16 and 17, exemplary program flows of the body-worn device with stress-reducing features 10 are shown. It is anticipated that some or all of the software described in FIGS. 16 and 17 run either on the processor 570 or on a remote processor (not shown) or a combination of such. For example, it is envisioned that the analysis 260 run on the processor 570 or data from the sensors is sent to a remote computing device, for example, using the Bluetooth transceiver 594 or the Wi-Fi transceiver 596 and the step of analysis 260 is performed on the remote computing device and the results sent back to the processor 570 for action.

In the example of FIG. 16, the system is initialized 200 (e.g. all signaling devices are turned off, the sensation emitting devices 20A/206/20C are turned off . . . ). Now, in a loop, one or more sensors are read 202 and then data from the sensors is analyzed 206. For example, the heart rate sensor 548 and blood pressure sensor 545 are read and data from the heart rate sensor 548 and blood pressure sensor 545 is analyzed 206, for example, comparing each to a prior or an expected heart rate and blood pressure. Certain increases in heart rate and blood pressure indicate increased stress, though in some embodiments, the pedometer 547 is also consulted (or a step count that is constantly maintained) to determine if the increase in heart rate and blood pressure are due to the wearer exercising.

If the analysis 206 does not indicate stress 208, the loop repeats. If the analysis 206 indicates stress 208, a soothing algorithm 210 is run, and then the loop repeats (e.g. re-running the soothing algorithm 210 if the analysis 206 still indicates stress 208.

In FIG. 17, an example of the soothing algorithm 210 is shown. The soothing algorithm 210 operates the one or more the sensation emitting devices 20A/206/20C, called SD1, SD2, and SD3 here. The soothing algorithm 210 starts by making sure the sensation emitting devices 20A/206/20C (SD1, SD2, and SD3) are all off 220 (not activated), then the first soothing device 20A (SD1) is energized 222. It is anticipated that, in some embodiments, the step of turning on and/or turning off is gradual or ramped, no shown for clarity and brevity reasons. Further, it is also anticipated that as one of the sensation emitting devices 20A/206/20C is gradually energized, the next one of the sensation emitting devices 20A/206/20C is gradually turned off or de-energized. Also, although shown in a sequential order (preferred), any order is anticipated.

After the first soothing device 20A (SD1) is energized 222, a delay 224 is taken, leaving the first soothing device 20A (SD1) on for a period of time. After the delay 224, the second soothing device 20B (SD2) is energized 226 and a second delay 228 is taken (e.g. a shorter delay for overlapping) and then after the second delay 228, the first soothing device 20A (SD1) is de-energized 230. Another delay 232 is taken, leaving the second soothing device 20B (SD2) energized for a period of time. After this delay 232, the third soothing device 20C (SD3) is energized 234 and another delay 236 is taken (e.g. a shorter delay for overlapping) and then after this delay 236, the second soothing device 20B (SD2) is de-energized 238. The third soothing device 20C (SD3) remains energized until after another delay 240 is taken, at which time the third soothing device 20C (SD3) is de-energized 242. By sequentially energizing the soothing devices 20A/20B/20C, the body-worn device with stress-reducing features 10 simulated stroking or rubbing of the skin of the wearer, which for many, provides a calming influence.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A body-worn device comprising:
a substrate, the substrate comprising a flexible material; and
a plurality of sensation emitting devices integrated into the substrate;
whereas, a selective operation of each sensation emitting device of the plurality of sensation emitting devices provides a sensation for soothing a wearer of the body-worn device;
wherein the selective operation comprises a repeated sequence of:
enabling operation of only a first sensation emitting device,
then enabling operation of both the first and a second sensation emitting devices, and
then enabling operation of only the second sensation emitting device.

2. The body-worn device of claim 1, wherein each sensation emitting device of the plurality of sensation emitting devices is a vibrating device.

3. The body-worn device of claim 1, wherein the selective operation of each sensation emitting device of the plurality of sensation emitting devices comprises a sequential operation of each sensation emitting device of the plurality of sensation emitting devices for simulating stroking.

4. The body-worn device of claim 1, wherein the selective operation of each sensation emitting device of the plurality of sensation emitting devices is initiated by an external signal.

5. The body-worn device of claim 1, wherein the body-worn device further comprises at least one sensor and data from the at least one sensor is analyzed to determine an emotional state of a wearer of the body worn device and if the emotional state indicates that soothing is needed, the selective operation of each sensation emitting device of the plurality of sensation emitting devices is automatically initiated.

6. The body-worn device of claim 1, wherein the substrate is formed into a sleeve for wearing on a wrist.

7. The body-worn device of claim 1, wherein the substrate is formed into a glove.

8. The body-worn device of claim 7, further comprising a sensor, a thenar switch, and a purlicue switch; the sensor detecting an orientation of the body-worn device with respect to a horizon; data from the sensor and a state of each of the thenar switch and the purlicue switch determine how an elongated object is held by the glove.

9. A method of soothing a wearer of a body-worn device, the method comprising:
detecting an emotional state of the wearer of the body-worn device; and
based upon the emotional state, energizing each of a plurality of sensation emitting devices of the body-worn device in a pattern;
wherein the selective operation comprises a repeated sequence of:
enabling operation of only a first sensation emitting device,
then enabling operation of both the first and a second sensation emitting devices, and
then enabling operation of only the second sensation emitting device.

10. The method of claim 9, wherein the detecting of the emotional state comprises reading data from one or more sensors that are integrated into the body-worn device and analyzing the data to determine the emotional state of the wearer.

11. The method of claim 9, wherein the pattern includes sequentially energizing the plurality of sensation emitting devices to simulate stroking.

12. The method of claim 9, wherein the sensation emitting devices comprise vibrating devices.

13. The method of claim 10, wherein the sensors comprise two or more sensors from the group consisting of a skin moisture sensor, a skin temperature sensor, a blood pressure sensor, and an $O_2$ sensor.

14. A body-worn glove comprising:
a substrate made of a flexible material;
a plurality of sensation emitting devices integrated into the substrate;
at least one sensor integrated into the substrate;
a processor integrated into the substrate, the processor is operatively coupled to each of the sensation emitting devices and the processor is operatively coupled to each of the at least one sensor; and
software running on the processor causes the processor to read data from each or the at least one sensor, to analyze the data, to calculate an emotional state, and responsive to the emotional state, to selectively energize each of the sensation emitting devices;
wherein the selective operation comprises a repeated sequence of:
enabling operation of only a first sensation emitting device,
then enabling operation of both the first and a second sensation emitting devices, and
then enabling operation of only the second sensation emitting device.

15. The body-worn glove of claim 14, wherein each sensation emitting device of the plurality of sensation emitting devices is a vibrating device.

16. The body-worn glove of claim 14, wherein responsive to the emotional state, the software causes the processor to selectively energize each of the sensation emitting devices in a sequential pattern for simulating stroking.

17. The body-worn glove of claim 14, wherein if the emotional state indicates that soothing is needed, the software running on the processor automatically sequentially energizes each sensation emitting device of the plurality of sensation emitting devices in a sequential pattern for simulating stroking.

18. The body-worn glove of claim 14, wherein the sensors comprise two or more sensors from the group consisting of a skin moisture sensor, a skin temperature sensor, a blood pressure sensor, and an $O_2$ sensor.

19. The body-worn glove of claim 14, further comprising one or more connectors on a surface of the substrate, each connector operatively interfaced to the processor and each connector for accepting an option device.

20. The body-worn glove of claim 14, further comprising a thenar switch and a purlicue switch; both the thenar switch and the purlicue switch operatively coupled to the processor.

21. The body-worn device of claim 1, wherein the repeated sequence further comprises:
   enabling operation of both the second and a third sensation emitting device after enabling operation of only the second sensation emitting device, and
   then enabling operation of only the third sensation emitting device.

22. The body-worn device of claim 9, wherein the repeated sequence further comprises:
   enabling operation of both the second and a third sensation emitting device after enabling operation of only the second sensation emitting device, and
   then enabling operation of only the third sensation emitting device.

23. The body-worn device of claim 14, wherein the repeated sequence further comprises:
   enabling operation of both the second and a third sensation emitting device after enabling operation of only the second sensation emitting device, and
   then enabling operation of only the third sensation emitting device.

* * * * *

UNITED STATES PATENT AND TRADEMARK OFFICE
CERTIFICATE OF CORRECTION

PATENT NO. : 11,079,845 B2
APPLICATION NO. : 16/397389
DATED : August 3, 2021
INVENTOR(S) : Matt Giordano Page 1 of 1

It is certified that error appears in the above-identified patent and that said Letters Patent is hereby corrected as shown below:

In the Claims

Column 12, Line 17: Claim 9, Delete "wherein the selective operation comprises" and insert -- wherein the pattern comprises --

Column 12, Line 53: Claim 14, Delete "wherein the selective operation comprises" and insert -- wherein the selectively energize comprises --

Signed and Sealed this
Fifth Day of October, 2021

Drew Hirshfeld
*Performing the Functions and Duties of the*
*Under Secretary of Commerce for Intellectual Property and*
*Director of the United States Patent and Trademark Office*